March 29, 1955     P. D. BECKER     2,704,870
YIELDABLE TONGUE REMOVABLE FASTENING DEVICE
Filed Aug. 22, 1952
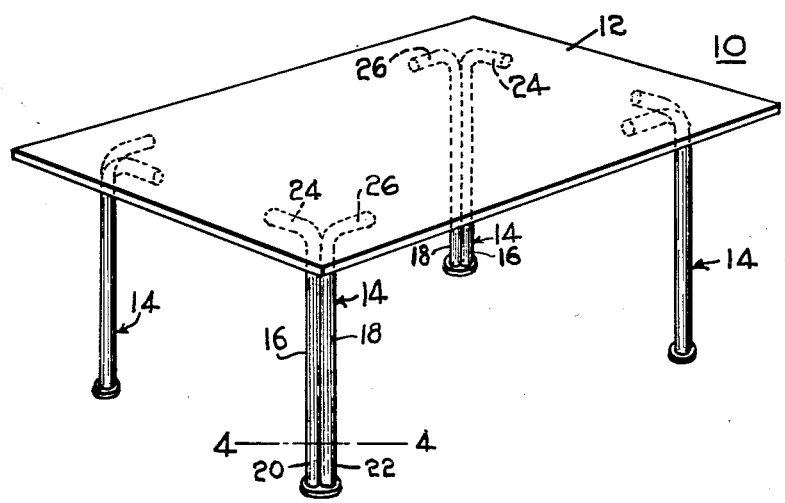
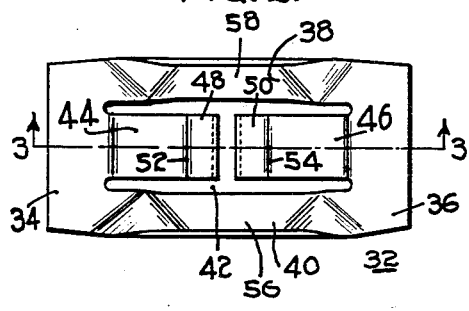
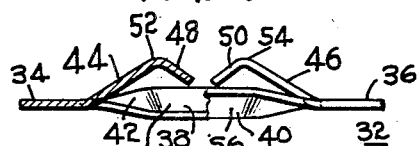
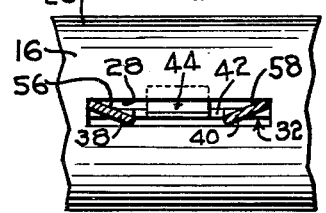
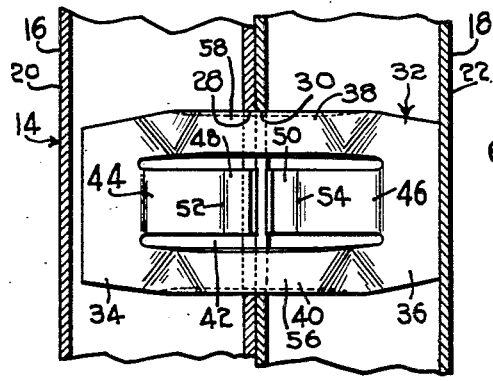
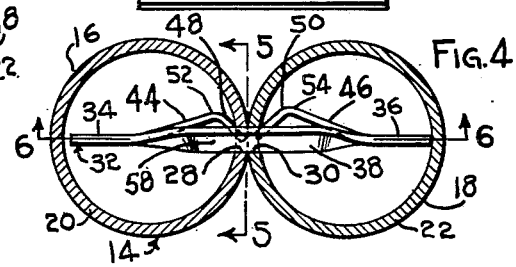
INVENTOR:
PHILIP D. BECKER,
BY Robert E Ross
ATTORNEY.

United States Patent Office 2,704,870
Patented Mar. 29, 1955

2,704,870

YIELDABLE TONGUE REMOVABLE FASTENING DEVICE

Philip D. Becker, Hingham, Mass., assignor to United-Carr Fastener Corporation, Cambridge, Mass., a corporation of Massachusetts Application August 22, 1952, Serial No. 305,821

2 Claims. (Cl. 24—73)

This invention relates generally to articles of furniture or the like, and has particular reference to a chair, table, or the like having a frame formed of tubular metal, and to a fastening device for use therein.

The object of the invention is to provide an improved article of furniture having a frame formed of tubular metal which is cheaper to assemble and has greater strength and rigidity than previous devices of this type.

A further object of the invention is to provide a fastening device for use in attaching superimposed co-lateral tubes during the assembly of such articles of furniture, which has great ability to resist twisting forces, longitudinal shear forces, and tensile forces applied thereto.

Other objects of the invention will, in part, be obvious, and will, in part, appear hereinafter.

In the drawing:

Fig. 1 is a perspective view of a table assembly embodying the features of the invention;

Fig. 2 is a top plan view of a fastener embodying the features of the invention;

Fig. 3 is a view in section taken on line 3—3 of Fig. 2;

Fig. 4 is an enlarged view in section taken on line 4—4 of Fig. 1;

Fig. 5 is a view in section taken on line 5—5 of Fig. 4;

Fig. 6 is a view in section taken on line 6—6 of Fig. 4.

Referring to the drawing, there is illustrated a table 10, which comprises generally a top 12 and a series of legs 14 supporting the top. The legs 14 are each formed of a pair of hollow metal tubes 16 and 18, having lower portions 20 and 22 which are disposed in superimposed parallel relation, and having upper ends 24 and 26 which are bent horizontally to lie against the lower side of the table top 12. The upper ends 24 and 26 may be secured to the top 12 by any convenient means, such as bolts, screws, or the like. The lower portions of the tubes 16 and 18 are provided with elongated longitudinal slots 28 and 30 in the walls thereof disposed in spaced relation to the ends, and are positioned therein so as to be aligned opposite one another in adjacent portions of the tubes.

To retain the tubes of each leg in assembly, a fastener 32 is assembled therewith, which is preferably formed of a single piece of sheet metal, and comprises a frame formed by a pair of flat end portions 34 and 36, joined by connecting side portions 38 and 40, forming a medial aperture 42. To provide means for snapping engagement in the slots 28 and 30, a pair of resilient arms 44 and 46 extend from the end portions generally toward each other, and are inclined out of the plane of the frame on the same side thereof. The arms are provided with free end portions 48 and 50 which are inclined in the opposite direction, thereby forming shoulders 52 and 54 which are disposed opposite each other on the arms in spaced relation to the plane of the frame.

To assist in retaining the fastener in engagement with the tubes, the connecting side portions 38 and 40, which are substantially wider than the width of the slots 28 and 30, are twisted between the ends to provide inclined medial portions 56 and 58, so that the overall thickness of the frame at said medial portions is greater than the width of the slots 28 and 30, for a purpose to appear hereinafter.

To assemble the fastener with the legs, one end of the fastener is inserted into a tube slot and forced therethrough so that one arm flexes toward the plane of the frame to pass therethrough, with the shoulder snapping into place behind an edge of the opening. The other tube may then be snapped onto the protruding end of the fastener in the same manner. During the entry of the fastener into the tube slots, the medial portions 56 and 58, since they have an overall height greater than the width of the slots, must flex to a lesser degree of inclination to conform to the width of the slots, and hence after assembly the edges of the medial portion are disposed in tight frictional engagement with the opposite edges of the slots (see Fig. 5).

After such assembly, the fastener prevents orbital movement of the tubes about each other, resists tensile forces tending to separate the tubes by reason of the arm shoulders engaged with the tube wall, the width of the fastener longitudinally of the tubes enables it to resist longitudinal shear forces applied between the tubes.

Although in the illustrated embodiment, each pair of tubes is provided with only one fastener, it will be understood that if desired, more fasteners may be assembled into each pair of tubes. The fastener may also be used in other portions of tubular frame furniture devices, such as joining frame members in seats or backs of chairs or the like.

Since certain other obvious changes may be made in the device without departing from the scope of the invention, it is intended that all matter contained herein be interpreted in an illustrative and not a limiting sense.

I claim:

1. A fastening device, comprising an elongated body formed by flat end members joined by spaced side members, and a pair of resilient arms extending from the end members generally toward each other, said arms being inclined upwardly out of the plane of the body and terminating in opposing free ends having downwardly inclined portions extending toward each other forming opposing shoulders disposed in spaced relation to the plane of the body, said side members having medial portions which are laterally inclined to increase the overall thickness of said medial portions.

2. A fastening device formed of a single piece of sheet metal, comprising a frame formed by flat end members joined by side members, and a pair of resilient arms extending from the end members generally toward each other, said arms being inclined upwardly out off the plane of the frame and terminating in free ends having downwardly inclined portions extending toward each other forming opposing snap shoulders disposed in spaced relation to the plane of the frame, the medial portion of said side members being laterally twisted, whereby said medial portion is effectively thickened.

References Cited in the file of this patent

UNITED STATES PATENTS

| | | |
|---|---|---|
| 2,126,482 | Lombard | Aug. 9, 1938 |
| 2,202,896 | Buchner | June 4, 1940 |
| 2,244,975 | Tinnerman | June 10, 1941 |
| 2,539,919 | Meek | Jan. 30, 1951 |
| 2,551,970 | Sampson | May 8, 1951 |
| 2,613,957 | Ritter | Oct. 14, 1952 |
| 2,665,927 | Becker | Jan. 12, 1954 |